Patented July 7, 1936

2,046,902

UNITED STATES PATENT OFFICE 2,046,902

PROCESS OF PRODUCING BITUMINOUS ROAD MIXTURES

Lester Kirschbraun, Leonia, N. J., assignor, by mesne assignments, to The Patent and Licensing Corporation, New York, N. Y., a corporation of Massachusetts No Drawing. Application August 22, 1931, Serial No. 558,845

3 Claims. (Cl. 106—31)

This invention relates to a method of producing bituminous road mixtures and particularly to mixtures in which the bituminous binder for mineral aggregate is employed in the form of an aqueous emulsion.

It is quite generally known that bituminous road mixtures may be made by combining bituminous emulsion with mineral aggregate so as to cause the emulsion to be deposited upon the surface of the aggregate, whereupon the emulsion coated aggregate is applied to a suitable road foundation. The commercial practice in the production of bituminous road compositions employing emulsions of bitumen involves the use, generally speaking, of an emulsion of bitumen of the type made with soap or soap-like material as the emulsifying agent. The aim in this practice is to produce a mixture in which the emulsion will rapidly break and cause the bitumen to deposit upon the stone or other aggregate after the mixture has been applied to the roadway. Difficulty is however frequently encountered in the practice of this method and variable results are obtained, depending upon the character of the aggregate employed, the stability of the emulsion, the amount of fines or dust included in the aggregate, the electrical charge carried by the dust, the presence of extraneous electrolytes in the mineral aggregate or the dust contained therein, and upon the climatic conditions under which the mixture is being made. Thus, it is frequently found that an emulsion which can satisfactorily be mixed with an aggregate of one type is totally unsatisfactory under the same conditions of treatment when a different type of aggregate is employed. Again, an emulsion that is satisfactorily mixed with an aggregate of a given type under certain atmospheric conditions and deposited upon the roadway, produces a mixture in which the stone or other aggregate is satisfactorily coated with the emulsion, whereas the same emulsion and the same aggregate when mixed in damp or wet weather, will produce an even deposit of the emulsion upon the stone, but after the mixture is spread out upon the roadway, the coalescence of the emulsion coating on the stone is so relatively slow owing to the moistness of the surrounding atmosphere that the rain frequently completely washes the coating of bituminous emulsion from the stone before any substantial quantities thereof have coalesced and adhered to the stone.

For such types of aggregate, particularly those which contain substantial proportions of fines or which, due to other influences, cause the emulsion to break before it has been uniformly deposited upon the individual pieces of the aggregate, it has been proposed to increase the stability of the emulsion and reduce or eliminate the tendency to breaking thereof during the mixing action with the aggregate, by incorporating therein, for example, several percent of excess alkali which apparently functions to inhibit the effect of oppositely charged aggregate particles and to bring the pH of the stone mixture to approximately the pH of the emulsified asphalt and thereby prevent the premature breaking that would otherwise ensue. When an emulsion which has thus or otherwise been treated so as to render it relatively highly stable in order to permit complete and uniform deposition of the bituminous emulsion upon the pieces of aggregate, the difficulty is frequently encountered that after the mixture has been spread upon the roadway the drying necessary to cause the breaking of the emulsion by evaporation of water is so prolonged that the breaking is exceedingly slow particularly where the material is applied as a layer of substantial thickness say in the neighborhood of two inches, in which case evaporation of water from the lowermost portion of the layer is exceedingly slow.

An object of the invention is to provide a method whereby a bituminous emulsion of relatively high degree of stability may be employed for admixture with various types of mineral aggregate whereby the emulsion may be rapidly and uniformly caused to be deposited upon the individual pieces of the aggregate independently of influences such as above mentioned that may cause the emulsion prematurely to break during the mixing action, and to overcome the drawbacks above noted which militate against rapid coalescence of the emulsion thus deposited upon the stone.

In accordance with the invention, I provide means whereby after the mineral aggregate has been coated with the bituminous emulsion of relatively high degree of stability, the emulsion is destabilized to such an extent that the particles of bitumen surrounding the individual pieces of stone rapidly coalesce and thereby mechanically express the water, without however causing the emulsion to become completely broken in the mixer and thereby stripping completely from the stone.

The type of destabilizing agent must be such as to cause direct coalescence and mechanical elimination of water rather than inversion of phase of the emulsion. Treatment, therefore with water soluble heavy metal salts is to be avoided as these produce immediate inversion to a water in asphalt system in which the water is entrapped in the asphalt and its removal greatly retarded. Additionally such treatment results in the immediate stripping of the wet film off the aggregate and the collection of the inverted emulsion into lumps and clots.

In one embodiment of the invention, I employ a stable emulsion containing 57 to 60% asphalt, of say 100 to 150° F. melting point, 1 to 7% of soap such as potassium oleate, 35 to 45% water and sufficient excess alkali (about 2% of KOH) to render the emulsion stable so that it may be satisfactorily mixed with a mineral aggregate such as limestone, or trap rock, graded to suitable sizes, for the construction of a roadway, any desirable form of mixing device being used for this purpose. The mixing action is continued for a time, generally totalling several minutes, sufficient to cause the emulsion to be uniformly deposited upon the individual pieces of the aggregate. As above indicated, a mixture of this type in which bituminous emulsion of a comparatively high degree of stability has been deposited upon mineral aggregate, frequency exhibits the drawback that the emulsion surrounding the pieces of stone fails to break within the desired minimum period of time. In order to accelerate the rate of break of the emulsion thus deposited upon the stone, I treat the mixture of stone and emulsion deposited thereon preferably while it is still in the mixing device, but destabilizing agents of various types and in such quantities as to promote rapid breaking of the emulsion after the coated aggregate is laid on the road foundation without however, completely breaking it while it is still in the mixer, the effect of the destabilizing agent used in this connection being to cause at least a partial removal of the stabilizing agent.

In carrying out the invention I may employ 1/50% to 2% on the basis of weight relative to the mixture of a destabilizing agent as boric acid, tannic acid, carbolic acid, zinc oxide or the like. Additions of decomposable ammonium salts such as ammonium carbonate or ammonium oxalate serve to produce corresponding acids which react with the excess alkali and emulsifier to produce a more or less regulated destabilization.

The amount of destabilizing agent necessary to effect the desired result will of course vary with the original stability of the emulsion employed, and with the temperature and drying conditions prevailing at the location and during the making of the mixture. Thus, where the drying conditions are such as to prolong the rate of break of the emulsion, larger quantities of the destabilizing agent must be used and on the other hand, where the aggregate is itself of such a character as to give it a tendency, by virtue of fine dust or electrolyte contained therein, to destabilize the emulsion, smaller quantities of the destabilizing electrolyte may be employed. In any event, however, the destabilizing agent should be of such a character and should be employed in such quantities as to control the stability of the mixture of emulsion and aggregate after it has been satisfactorily coated by the emulsion, so that a regulated rapid destabilization and rate of break will occur after the material has been applied to the roadway.

I claim as my invention:

1. The process of producing a road paving mixture which comprises mixing mineral aggregate with a soap-type emulsion of asphalt until the aggregate is uniformly coated with a film of the emulsion, adding to the emulsion coated aggregate while continuing the mixing action a destabilizing agent capable of mixing with the emulsion coated aggregate without producing immediate coalescence but which on subsequent exposure of the coated aggregate produces accelerated coalescence of the bitumen particles.

2. The process of producing a road paving mixture which comprises mixing aggregate with a soap-type emulsion of asphalt until the aggregate is uniformly coated with a film of the emulsion, and adding to the emulsion coated aggregate a destabilizing agent possessing incipient and final emulsion coalescing properties, selected from the group consisting of weak acids, decomposable ammonium salts of weak acids, and oxides of amphoteric metals.

3. The process of producing a road paving mixture which comprises mixing aggregate with a soap-type emulsion of asphalt until the aggregate is uniformly coated with a film of the emulsion, and adding to the emulsion coated aggregate a destabilizing agent comprising relatively small quantities of zinc oxide.

LESTER KIRSCHBRAUN.